Patented Feb. 7, 1933

1,896,191

UNITED STATES PATENT OFFICE

WILHELM ZIMMERMANN, OF FRIEDRICHSFELD, AND WALTER FRANKENBURGER, OF LUDWIGSHAFEN-ON-THE-RHINE, GERMANY, ASSIGNORS TO WINTHROP CHEMICAL COMPANY, INC., OF NEW YORK, N. Y., A CORPORATION OF NEW YORK

PRODUCTION OF VITAMIN D

No Drawing. Application filed August 16, 1928, Serial No. 300,156, and in Germany August 26, 1927.

The methods hitherto known and described for the preparation of the antirachitic vitamin D from ergosterol are based on the treatment of ergosterol solutions with ultra-violet rays, the spectral position of the said rays being selected in accordance with the absorption range of the ergosterol, and the intensity being as high as possible in order to accelerate the photochemical transformation. The formation of the vitamin D has been controlled, qualitatively, by means of the observation of the changes in the absorption spectrum of the solutions, and also by the specific physiological action attendant on its formation. For the quantitative determination, use has been made of the chemical method of digitonine precipitation to record the diminution of the ergosterol.

We have now found by exact investigations of the absorption spectra, carried out by means of special sources of ultra-violet light, for example, a hydrogen lamp for, high voltage giving a continuous ultra-violet spectrum, that it is possible also to directly ascertain quantitatively the amount of vitamin D formed, thus enabling the progress of the photochemical reaction to be studied more exhaustively. Observations based on this method have led to a new process, by means of which products with a maximum content of vitamin D can be obtained, while avoiding losses the source of which had hitherto not been discovered. The essence of the process resides in the fact that the exposure of ergosterol, and especially of its solutions, to the action of ultra violet rays is reduced in intensity or altogether suspended before all the ergosterol has been transformed, so that the time at which maximum absorption in the range of the spectrum lying between $\lambda=300\mu$ $\mu$ and $\lambda=230\mu$ $\mu$ specific for vitamin D occurs, is not, or is not substantially exceeded.

It has been found that during the exposure of ergosterol dissolved, for example, in alcohol, pentane, heptane, or other solvents, to ultra-violet rays the vitamin D appears solely as an intermediate product, and that it, when the irradiation is continued, undergoes transformation into a final product which differs fundamentally from vitamin D in respect of the absorption spectrum, the said product also differing from vitamin D in its physiological action. The formation of this final product may be easily detected by reason of the fact that on continuing the exposure of the solutions to ultraviolet rays the characterisic absorption range for vitamin D revealed by a maximum extinction between $\lambda=300\mu$ $\mu$ and $\lambda=230\mu$ $\mu$ begins to grow brighter, and disappears entirely in the case of samples which have been subjected to a very considerable exposure to the action of the said rays.

The fact thus disclosed, that vitamin D is a well defined intermediate product, and not a final product, of the photochemical treatment of ergosterol may be further demonstrated in the following manner. It has been found impossible to reproduce a series of solutions obtained by the exposure of solutions of ergosterol to ultra-violet rays for progressively longer periods of time and characterized by the nature of their absorption spectra, by merely mixing the initial solution of ergosterol in successively graduated proportions with the solution of the final product resulting from intensive exposure to the action of the rays. On the contrary, in order to reproduce the initial or final course of the said series, it is necessary to mix with the initial or final product, in graduated proportions, a solution which has been obtained by moderate irradiation and which contains a maximum content of vitamin D. By means of standard comparative mixtures prepared in this manner, it is possible to obtain quantitative determinations of the content of ergosterol, vitamin D and the final product present in irradiated samples. Also by means of this method, it can be easily ascertained that the photochemical transformation ergosterol—vitamin D—final product proceeds in such a way that, at that stage of the reaction at which maximum quantities of vitamin D have been formed, they are still accompanied by considerable amounts, corresponding to the intensity of distribution of the source of radiant energy employed of ergosterol, and that, on the other hand, when the ergosterol is completely exhausted, a considerable portion of the vitamin D has already been transformed into the final product. Consequently a method like the one hitherto customary, which is based on the determination of the amount of ergosterol which has disappeared, must lead to an over-exposure which considerably impairs the yield of vitamin. This drawback, however, is completely obviated by the present process.

The said process may be carried out in various ways. For example, the irradiation can be regulated and restricted by supervising the progress of the reaction by spectral analysis in an apparatus which is integrally connected with the irradiation apparatus and which is traversed by the reaction liquid. Spectrographical or photoelectrical methods may be made use of and an automatic control can be provided by coupling the registration apparatus with the source of irradiation, so that when the desired optical condition is registered, the said source of irradiation is automatically cut off.

The adjustment of the irradiation in order to obtain a maximum production of vitamin D can also be effected with an irradiation device of known capacity, in which the degree of irradiation necessary for a maximum output of vitamin D is kept within limits by continuously passing the solution under treatment before the source of light at such a velocity that, by the time of issuing from the irradiation chamber, the desired optical condition will have been attained.

Finally, it has been found that, by a suitable selection of the working conditions of the source of radiation or by the interposition of suitable light filters, which absorb the rays of a wave length which is shorter than $\lambda=290\mu\mu$, for instance filters of a glass known under the trade-mark "uviol glass", the radiation which produces the formation of the final product can be cut out, to a certain extent, from the radiation which is effective for the transformation of the ergosterol into vitamin D, so that the undesired photochemical secondary reaction can, to some extent, be suppressed.

The following examples will further illustrate the nature of the said invention which however is not limited thereto.

*Example 1*

A solution of ergosterol, for example, 5 grams of ergosterol in 5 litres of alcohol, is irradiated with ultra-violet light. Samples of a few cubic centimetres each are taken at equal intervals, say every ten minutes and placed either as they are or in suitable dilution in a test vessel disposed between a source of continuous ultra-violet light and an apparatus for examining the ultra-violet absorption, for example, a quartz spectrograph. The successive samples show increasing absorption between $\lambda=300\mu\mu$ and $\lambda=230\mu\mu$. The attainment of the maximum absorption, within this range, for the total quantity irradiated, is ascertained by continuing to irradiate a sample which is already strongly absorbent, until incipient brightening occurs, and then comparing it with the samples previously taken. When the maximum absorption is attained, the irradiation is suspended. The absorption spectrum will then reveal, in conformity with a check digitonine precipitation, the presence of 4 per cent of still unaltered ergosterol.

*Example 2*

In order to enable a more reliable check to be obtained, the regular sampling of the irradiated solution is replaced by a testing apparatus integrally connected to the irradiation apparatus, and consisting of a test glass, with feed and discharge tube, which is continuously traversed by the irradiated solution. In this case the measurement of the absorption is preferably effected continuously, for example by means of a photoelectrical cell which is sensitive only in the region between $\lambda=300\mu\mu$ and $\lambda=230\mu\mu$, and which emits a minimum of photoelectric current at the moment the vitamin content attains a maximum. By means of an amplifying device, the photoelectric cell can also be arranged to shut off the source of irradiation automatically on the maximum content of vitamin being attained.

*Example 3*

The irradiation of the ergosterol is effected in a continuous manner, an irradiation vessel, in the form of a cylinder 30 centimetres long and 5 centimetres internal diameter, with terminal intake and outlet tubes, being employed for this purpose. In this case, the testing apparatus is integrally connected to the outlet tube. By regulating the rate of flow, by means of a pump or high level storage vessel, it can easily be arranged that the liquid issues from the irradiation vessel in the desired condition. In the case of a quartz-mercury lamp the correct velocity lies between 1 and 2 cubic centimetres per second. If the transformation of ergosterol is below the desired degree, the rate of flow is reduced, while if the maximum of the vitamin content is passed, the rate of flow is increased. The apparatus for the further treatment of the vitamin solutions is attached directly to the irradiation device.

What we claim is:

1. The improvement in the production of vitamin D by exposing a solution of ergosterol to the action of ultra-violet rays which comprises passing a solution of ergosterol by a source of ultra-violet rays, supervising the progress of reaction by spectral analysis of part of the reaction mixture and interrupting the exposure before all of the ergosterol is transformed and before the maximum absorption in the range of the spectrum between $\lambda=300\mu\mu$ and $\lambda=230\mu\mu$ specific to vitamin D is substantially exceeded.

2. In the production of vitamin D by exposing ergosterol to the action of ultra-violet rays, the steps comprising irradiating the ergosterol, supervising the progress of reaction by spectral analysis and interrupting the exposure before the maximum absorption in the range of the spectrum between $\lambda=300\mu\mu$ and $\lambda=230\mu\mu$ is substantially exceeded.

3. In the production of vitamin D by exposing ergosterol to the action of ultra-violet rays, the steps comprising irradiating the ergosterol in the form of a solution, supervising the progress of reaction by spectral analysis and interrupting the exposure before the maximum absorption in the range of the spectrum between $\lambda=300\mu\mu$ and $\lambda=230\mu\mu$ is substantially exceeded.

4. In the production of vitamin D by exposing ergosterol to the action of ultra-violet rays, the steps comprising irradiating the ergosterol, supervising the progress of reaction by spectral analysis and interrupting the exposure at about the time when the maximum absorption in the range of the spectrum between $\lambda=300\mu\mu$ and $\lambda=230\mu\mu$ has been reached.

In testimony whereof we have hereunto set our hands.

WILHELM ZIMMERMANN.
WALTER FRANKENBURGER.